United States Patent [19]

Byrd

[11] Patent Number: 5,858,468
[45] Date of Patent: Jan. 12, 1999

[54] CHEMICAL RESISTANT COATINGS

[75] Inventor: Norman R. Byrd, Villa Park, Calif.

[73] Assignee: McDonnell Douglas Corporation, St. Louis, Mo.

[21] Appl. No.: 604,877

[22] Filed: Oct. 29, 1990

[51] Int. Cl.⁶ .............................. B05D 3/02; B32B 27/28; C08G 77/24; C08G 77/385
[52] U.S. Cl. ............................ 427/387; 428/447; 528/15
[58] Field of Search ................ 528/15; 427/387; 428/447

[56] References Cited

U.S. PATENT DOCUMENTS

| | | | |
|---|---|---|---|
| 3,775,452 | 11/1973 | Karstedt | 528/15 |
| 3,814,731 | 6/1974 | Nitzsche et al. | 528/15 |
| 3,992,427 | 11/1976 | Chandra et al. | 528/15 |
| 4,077,943 | 3/1978 | Sato et al. | 428/447 X |
| 4,600,484 | 7/1986 | Drahnak | 528/15 |
| 4,943,475 | 7/1990 | Baker et al. | 428/447 X |

*Primary Examiner*—Richard D. Lovering
*Attorney, Agent, or Firm*—Bell Seltzer Intellectual Property LawGroup of Alston & Bird LLP

[57] ABSTRACT

A coating having resistance to chemical warfare agents, comprising a cured mixture of (a) a polysiloxane having unsaturated groups available for cross-linking and (b) a polysiloxane containing reactive Si—H groups. A platinum siloxane catalyst is also employed in the mixture. A representative coating composition is a mixture of vinyldimethly terminated polydimethylsiloxane polymethylhydrosiloxane; and platinum-divinyl-tetramethyldisiloxane complex catalyst. The coating composition cures at room temperature and in a relatively short period of time.

15 Claims, No Drawings

CHEMICAL RESISTANT COATINGS

BACKGROUND OF THE INVENTION

This invention relates to chemical resistant polymer coatings, and is particularly directed to the provision of chemical warfare agent resistant polysiloxane coatings on substrates such as structural metals, e.g. aluminum.

Survival of aircraft in a chemical warfare (CW) environment requires that the aircraft materials of construction be able to withstand the effects of either the CW agents and/or the subsequent decontamination procedures required to remove these agents. The problems created by these CW agents are: (1) corrosion of aircraft materials and structures; (2) swelling and degradation of seals, insulation, and transparencies; and (3) deterioration of avionic components and wiring. Additionally, current decontamination agents and procedures are equally severe and can also have a detrimental effect on aircraft structures and components. To change the aircraft materials of construction for protection against a specific agent also becomes impractical. Thus, a coating that can be applied to all areas of an aircraft which will exhibit minimal adsorption and/or absorption of the CW agent and from which the agents can be readily desorbed by washing with soap and water is a particular object of the invention.

Various procedures have been considered for minimizing the effect of CW agents on aircraft materials of construction. The basic process is to allow the contaminant to make contact with the aircraft and then resort to decontamination procedures. However, the decontamination process is quite severe with a serious adverse effect on the aircraft materials of construction.

Another method is to coat the surface with a water-soluble polymer into which the CW agent is absorbed. Subsequently, this coating is washed off with water and the substrate is protected. This process has the limitation of being applicable to surfaces that would not be affected by water, e.g., metal or composite. Sensitive avionic equipment might sustain damage from the water. Additionally, if the outer surface was so protected and the aircraft was flying through rain, or was being washed down, it would remove the coating. Thus, this becomes somewhat impractical.

Another method that has been considered is to coat the surface with parylene. This is a good surface, but impractical to apply on a large area. It would be effective for small parts because the method of application involves heating a monomer (para cyclophane) under vacuum and passing the resultant diradical that forms into a chamber at low temperatures, at which point the parylene polymer will form by condensing on a substrate. This is quite impractical for a large surface structure.

Hence, another object of the invention is to provide a liquid polymer that can be applied to any substrate and which will form a coating with a "low sticking coefficient." By definition, a "low sticking coefficient" coating is one on which little material would be adsorbed and relatively little would be absorbed after long exposure time. Additionally, it would also allow for a relatively rapid desorption, and from which the adsorbed agent can be removed by washing with soap and water. TEFLON, a registered trademark for tetrafluoro is a good example of a "low sticking coefficient" material, but TEFLON cannot be used since it is not possible to make a continuous film of teflon from solution. It can only be applied to substrates by sintering TEFLON powder at high temperature to make a contiguous coating. Commercial TEFLON film is not practical since it cannot be made to readily adhere to most substrates.

Polydimethyl siloxane (silicone rubber) has been used as coatings, but such coatings have not proven sufficiently resistant to CW agents or their simulants. Moreover, to cure a conventional siloxane of this type, it is necessary to treat with a peroxide at high temperature, posing problems for preparation of coatings, particularly for large area surfaces, and hence is not feasible.

Mixtures of various siloxane components for reaction to form a polymer are known. Thus, it is known to react unsaturated siloxanes with cross linking agents to produce siloxane polymers. However, application of such mixtures to a substrate for formation of a coating resistant to chemical warfare agents has not heretofore been achieved.

Accordingly, still other objects of the invention are the provision of mixtures of modified siloxanes which upon curing show minimal adverse effects after exposure to CW agents or simulants, the application of such mixtures of siloxanes to a substrate such as aluminum, and the resulting cured coating systems which are resistant to CW agents or simulants thereof.

SUMMARY OF THE INVENTION

According to the invention, the above objects are achieved by the provision of a class of modified polysiloxanes that are capable upon curing of showing minimal adverse effects after exposure to CW agents or to CW simulants.

The coating composition of the invention is in the form of a liquid mixture of (a) a polysiloxane having unsaturated groups available for cross-linking, such as a vinyl group, and (b) a polysiloxane containing reactive Si—H groups. A small amount of a platinum siloxane catalyst is also present.

Such liquid coating composition, with or without a solvent, can be applied at room temperature to a substrate such as aluminum, and the resulting coating cured at room temperature in a short period of time.

DETAILED DESCRIPTION OF THE INVENTION AND PREFERRED EMBODIMENTS

The reactants involved in preparing the basic CW agent resistant coatings of the invention are (a) a polysiloxane having unsaturated groups available for cross-linking, (b) a polysiloxane containing reactive Si—H groups, and (c) a platinum siloxane catalyst.

As examples of compound (a) above, polysiloxanes having various unsaturated functional groups can be employed. Such unsaturated groups include vinyl, acrylic and methacrylic groups. Specific examples of such compounds are as follows Polydimethylsiloxane, vinyl dimethylterminated (molecular weight 3,700 to 18,000)

$$CH_2=CH-Si(CH_3)_2-O-[Si(CH_3)_2-O]_n-Si(CH_3)_2-CH=CH_2 \quad \text{I}$$

Dimethylsiloxane-vinylmethylsiloxane copolymer (molecular weight 10,000 to 30,000)

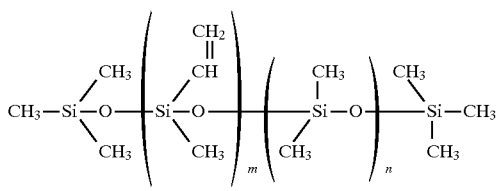

An additional example is a trifluoro compound similar to compound II, but having a trifluoropropyl group in place of one of the methyl groups, and represented below.

Methyl 3,3,3-trifluoropropyl vinylmethylsiloxane copolymer

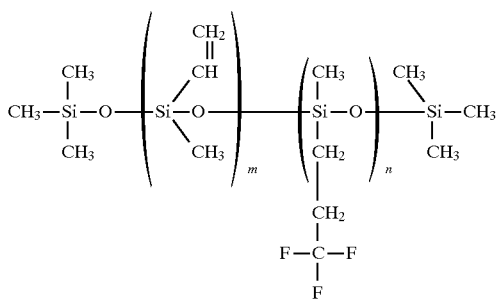

Generally, in the above polysiloxanes having an unsaturated group, the value n in compound I, and m+n in compounds II and IIa are such that such compounds can have an overall molecular weight ranging from about 500 to about 500,000.

Any of the compounds I, II and IIa above can be used separately or in combination. It has been found that compound II is preferred, and that a combination of compounds I and II is particularly effective.

Compound (b) above is a polysiloxane containing reactive Si—H groups or a hydrosiloxane, and functions as a cross-linking agent providing cross-linking sites for reaction with compound (a), the polysiloxane having unsaturated functional groups. Examples of compound (b) are as follows Polymethylhydrosiloxane (PMHS) (molecular weight 390, 1500 or 2270)

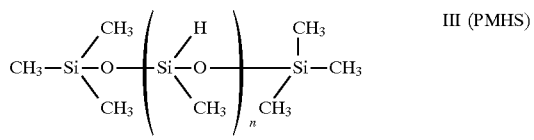

where n is 5 to 46.

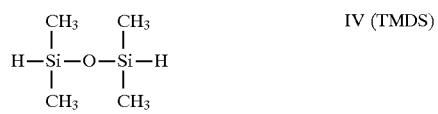

The above siloxanes containing an Si—H group can have a molecular weight ranging from about 134 to about 2300.

A suitable platinum catalyst, compound (c), for the reaction between compounds (a) and (b) above is required. Various platinum catalysts can be employed, such as platinum-divinyltetramethyldisiloxane complex (V) in xylene solvent, and platinum cyclovinylmethyl siloxane complex, the preferred catalyst being the former. Each of the above catalysts is a chloroplatinic acid complex with a vinylsiloxane compound, and is denoted generally herein as a platinum siloxane catalyst.

Thus, for example, compound I, II or IIa, or a combination thereof, e.g. a combination of I and II can be used, together with compound III or IV, or with a combination of III and IV, and catalyst V.

The proportions of compounds (a) and (b) employed for reaction can vary widely, depending on the desired properties of the final coating. Thus, the mixture of compounds (a) and (b) can be employed in a range of proportions from about 1 to about 99% of compound (a), or a combination thereof, and about 99 to about 1% of compound (b), or a combination thereof, by weight of the mixture. For optimal proporties of the coating, that is, a highly adhesive durable coating having high resistance to chemical warfare agents, the preferred range of proportions is about 20 to about 80% of compound (a), or a combination thereof, and about 80 to about 20% of compound (b), by weight of the mixture.

Only a small amount of catalyst, compound (c), is required, e.g. ranging from about 0.04 to about 0.8%, by weight of the overall mixture of compounds (a) and (b).

The substrates to which the coating composition or mixture of compounds (a), (b) and (c) is applied can vary widely and can include metals, e.g. aluminum, titanium and steel, plastics, composites, e.g. fiberglass reinforced epoxy, fibers and fabrics, such as fiberglass, and the like.

The coating composition or mixture can employ a solvent medium such as tetrahydrofuran (THF) or methylene chloride, or can employ a neat system, that is, no solvent at all, wherein the liquid reactants are simply mixed together to form a liquid coating composition. A solvent is generally used where any problem of solubility of one or more of the reaction components is presented.

The curing or polymerization reaction of the coating composition of compounds (a), (b) and (c) takes place at room temperature. Thus, the coating composition can be formulated at room temperature and applied to the substrate, and the coating cures at room temperature in a matter of minutes, e.g. about 2 to about 60 minutes. Any conventional coating method can be employed for applying the ocating composition to the substrate, e.g. by pouring, brushing, or doctor blade.

The following are examples of practice of the invention for obtaining CW agent resistant coatings. In each case, the components were mixed in the amounts set forth, and the resulting liquid composition applied to an aluminum substrate and cured at room temperature.

EXAMPLE 1

30 grams I (M.W. 5970)

0.75 gram III (PMHS) (M.W. 1500)

0.0172 gram V (Pt. catalyst)

50 mls. Tetrahydrofuran (THF)

After stirring the mixture to make it homogeneous (about five minutes), the solution was poured onto the aluminum substrate and, within 20 minutes at room temperature, the sample was cured to a clear, slightly bubbly, rubbery coating.

EXAMPLE 2

38.8 grams I (M.W. 5970)

5.0 grams III (PMHS - M.W. 390)

0.0172 gram V

After stirring and pouring onto the aluminum substrate, the same type of coating as in Example 1 formed.

EXAMPLE 3

15 grams II (M.W. 30,000)

0.4318 gram III (PMHS-M.W. 1500)

0.0338 gram V

When poured onto the aluminum substrate, a coating similar to the coating of Example 1 resulted.

EXAMPLE 4

15 grams II (M.W. 30,000)
0.8339 gram III (PMHS-M.W. 390)
0.172 gram V

EXAMPLE 5

15 grams II (M.W. 30,000)
0.0004 gram (0.5 ml) IV
0.0466 gram V

EXAMPLE 6

The composition of Example 4 is employed, but substituting for compound II the same amount of compoundIIa.

A coating is obtained similar to the coating of Example 4.

In each of the above examples 1 to 6, to test these coatings for their resistance to a CW agent simulant, dimethyl methylphosphonate (DMMP), similar to the live CW agent known as (SARIN)(GB), a few drops of the simulant were put on top of the coating and left there for three days. After washing off the simulant with water and methyl alcohol, a weight change was determined. It was found that they all decreased in weight by about between 0.09% and 0.2%; with the average being about 0.15%. This shows that there is substantially no reaction between the CW simulant and the coating and that the CW simulant does not remain on the surface of the coating. For optimum results such weight should be negligible. Additionally, the contact angle of the drops of the DMMP simulant with the surface of the coatings was between low and medium, e.g. between about 45° and 75°, respectively. Such contact angle is a measure of the degree of wettability of the drops of CW simulant with the surface of the coating, the greater the angle of contact, the greater the wettability of the drops with the coating. The object is to reduce wettability as much as possible and thus decrease adherence of the CW agent or simulant to the coating surface. Thus, the coatings of the invention formed by reaction of the modified polysiloxane components hereof showed relatively little interaction and effect due to the presence of the DMMP simulant.

By comparison a standard polysiloxane silicone rubber coating treated with the above simulant in the same manner as noted above, showed a 10% increase in weight by contact with the DMMP CW simulant over the same period of time and showed a contact angle between the CW simulant and such coating of about 150°, indicating substantial interaction and effect due to the presence of the DMMP simulant.

However, in some instances the surfaces of the modified polysiloxane coatings of the invention had bubbles, and this could result in a rough textured surface as well as a potential point for CW agent or simulant absorption. Such bubbly coatings are due to the liberation of hydrogen from the Si—H groups of component (b) containing such groups. If heat is applied gently to the coated surface during curing, e.g. with a hot air gun, the bubbles can be forced out of the coating so that the result is a relatively smooth coating.

The coatings of the invention can also find application as protective coatings on all surfaces exposed to dirt and grime, such as aircraft interiors.

From the foregoing, it is seen that the invention provides improved tough, durable surface coatings which can be permanently bonded to structural substrates, such coatings being resistant to various contaminants such as chemical warfare agents, as evidenced by resistance to simulants thereof, and/or resistant to dirt and grime. Particular advantages reside in the simplicity and ease of forming the coatings, and the process for forming the coatings is energy conserving since no heat is required for curing the coating.

Since various changes and modifications of the invention will occur to those skilled in the art within the spirit of the invention, the invention is not to be taken as limited except by the scope of the appended claims.

What is claimed is:

1. A coating on a substrate, said coating having resistance to chemical warfare agents, said coating comprising a cured mixture of compounds (a) a combination of dimethylsiloxane-vinylmethylsiloxane copolymer and methyl 3,3,3-trifluoropropyl-vinylmethylsiloxane copolymer, and (b) a polysiloxane containing reactive Si—H groups.

2. The coating on a substrate as defined in claim 1, wherein said copolymers each have a molecular weight ranging from about 500 to about 500,000.

3. The coating on a substrate as defined in claim 1, wherein compound (b) is a polysiloxane selected from the group consisting of polymethylhydrosiloxane and 1,1,3,3-tetramethyldisiloxane, and combinations thereof.

4. The coating on a substrate as defined in claim 1, said mixture containing about 1 to about 99% of compound (a) and about 99 to about 1% of compound (b), by weight of said mixture.

5. The coating on a substrate as defined in claim 1, said mixture containing about 20 to about 80% of compound (a) and about 80 to about 20% of compound (b), by weight of said mixture.

6. A composition consisting essentially of a mixture of (a) a combination of dimethylsiloxane-vinylmethylsiloxane copolymer and methyl 3,3,3-trifluoropropyl-vinylmethylsiloxane copolymer, and (b) a polysiloxane containing reactive Si—H groups, and (c) a suitable platinum catalyst, and which composition is capable of being cured at room temperature and permanently bonded to a structural substrate to provide a coating having resistance to chemical warfare agents and simulants thereof.

7. The composition as defined in claim 6, wherein compound (b) is a polysiloxane selected from the group consisting of polymethylhydrosiloxane and 1,1,3,3-tetramethyldisiloxane, and combinations thereof, and said platinum catalyst is platinum-divinyl-tetramethyldisiloxane complex.

8. The composition as defined in claim 6, said mixture containing about 1 to about 99% of (a) and about 99 to about 1% of compound (b) by weight of said mixture.

9. The composition as defined in claim 6, said mixture containing about 20 to about 80% of (a) and about 80 to about 20% of compound (b), by weight of said mixture.

10. A method of rendering a substrate resistant to chemical warfare agents, which comprises applying to said substrate a mixture of (a) a polysiloxane having unsaturated groups available for cross-linking, (b) a polysiloxane containing reactive Si—H groups, and (c) a platinum siloxane catalyst, and curing said mixture to form a coating resistant to chemical warfare agents and to which coating said agents have decreased adherence, and contacting said coating with a chemical warfare agent.

11. The method as defined in claim 10, wherein compound (a) is a polysiloxane containing vinyl, acrylic or methacrylic groups.

12. The method as defined in claim 11, wherein compound (a) is a mixture of vinyl dimethylterminated polydimethylsiloxane and dimethylsiloxane-vinylmethylsiloxane copolymer.

13. The method as defined in claim 10, wherein compound (a) is a polysiloxane selected from the group consisting of vinyl dimethylterminated polydimethylsiloxane, dimethylsiloxane-vinylmethylsiloxane copolymer, and methyl 3,3,3-trifluropropyl-vinylmethylsiloxane copolymer and combinations thereof, wherein compound (b) is a polysiloxane selected from the group consisting of polymethylhydrosiloxane and 1,1,3,3-tetramethyldisiloxane, and combinations thereof, and said platinum siloxane catalyst is selected from the group consisting of platinum-divinyltetramethyldisiloxane complex, and platinum cyclovinylmethylsiloxane complex.

14. The method as defined in claim 10, said mixture containing about 1 to about 99% of compound (a) and about 99 to about 1% of compound (b), by weight of said mixture.

15. The method as defined in claim 14, wherein compound (a) is a polysiloxane selected from the group consisting of vinyl dimethylterminated polydimethylsiloxane, dimethylsiloxane-vinylmethylsiloxane copolymer, and methyl 3,3,3-trifluropropyl-vinylmethylsiloxane copolymer and combinations thereof, said compound (b) is a polysiloxane selected from the group consisting of polymethylhydrosiloxane and 1,1,3,3-tetramethyldisiloxane, and combinations thereof, and said platinum siloxane catalyst is selected from the group consisting of platinum-divinyltetramethyldisiloxane complex, and platinum cyclovinylmethylsiloxane complex.

\* \* \* \* \*